United States Patent [19]

Susuki et al.

[11] 3,864,201

[45] Feb. 4, 1975

[54] THERMOPLASTIC RESINS LOADED WITH FILLER BONDED TO COVER LAYERS

[75] Inventors: Rinnosuke Susuki; Hiroshi Hoshi; Jiro Saito; Koichi Takano; Kiyoshi Yoshikawa, all of Tokyo, Japan

[73] Assignee: Lion Fat and Oil Co., Ltd., Tokyo, Japan

[22] Filed: Sept. 30, 1971

[21] Appl. No.: 185,244

[30] Foreign Application Priority Data
Oct. 6, 1970 Japan................................ 45-99495
Oct. 6, 1970 Japan................................ 45-99497
Oct. 6, 1970 Japan................................ 45-99498
Oct. 6, 1970 Japan................................ 45-99502
Oct. 6, 1970 Japan................................ 49-99503
Oct. 6, 1970 Japan................................ 45-99508

[52] U.S. Cl.................. 161/160, 161/161, 161/162, 161/403, 260/2.5 B, 260/2.5 FP, 260/29.6 S, 260/41 B
[51] Int. Cl............................ B32b 3/26, B32b 5/18
[58] Field of Search ........... 161/160, 168, 161, 162, 161/403; 260/2.5 B, 2.5 FP, 29.6 S, 41 B

[56] References Cited
UNITED STATES PATENTS

| 3,104,196 | 9/1963 | Shannon............................. 161/208 |
| 3,389,196 | 6/1968 | Stahl.................................... 161/161 |
| 3,411,967 | 11/1968 | Rowland et al..................... 161/161 |
| 3,451,842 | 6/1969 | Kurz et al. .................... 161/161 UX |
| 3,630,820 | 12/1971 | Leach................................. 161/168 |
| 3,691,003 | 9/1972 | Elischer.............................. 161/161 |
| 3,697,366 | 10/1972 | Harlock et al..................... 161/162 |

Primary Examiner—William J. Van Balen
Attorney, Agent, or Firm—Cushman, Darby & Cushman

[57] ABSTRACT

A flame retardant laminated material which gives out no poisonous gas even if it should burn, prepared by bonding a member consisting of any material other than a resin composition as defined below to at least one side of a molding of thermoplastic homopolymer resin, a copolymer of thermoplastic resins, or a mixture of thermoplastic resin and copolymer, incorporated with either or both of calcium sulfite and gypsum as a filler.

13 Claims, 9 Drawing Figures

THERMOPLASTIC RESINS LOADED WITH FILLER BONDED TO COVER LAYERS

DETAILED DESCRIPTION OF THE INVENTION

This invention relates to a laminated material, more specifically, to a laminated material suitable for use as building materials, furniture, doors, curtain walls, and the like.

Up to now a variety of foamed plastics have been known, but they have common disadvantages such as high cost, low impact resistance, and poor processability. They lack durability and are often restricted by cutting and fitting means when used as building materials for wall, ceiling, doors, curtain walls, etc. Further, these foamed plastics have a fatal drawback that they are easy to burn and emit poisonous gases upon burning, causing pollution problems.

There have been various kinds of laminated materials in which the surface layer of plastics sheet or plate is formed on the surface of a metal plate. Although the plastics surface layer is effective for protection or decoration of the metal plate, it still has a fatal drawback, as with the above-mentioned foamed plastics, that it is easy to burn and gives out poisonous gases upon burning.

This invention has been made in an attempt to solve many disadvantages as mentioned above.

A primary object of this invention is to provide a laminated material free from weak points inherent to the conventional foamed plastics or laminated materials, in which foamed plastics of thermoplastic resin filled with either or both of calcium sulfite and gypsum is formed as a surface layer on the woody substrate.

A secondary object of this invention is to provide a laminate in which such weak points as decay, cracks, verminous deterioration, etc. which are inherent to woody substrates are solved by protecting one side or both sides of the woody substrate with a surface layer.

A third object of this invention is to provide a laminate in which all weak points inherent to the conventional foamed plastics or laminated materials are solved by forming on a metallic substrate a surface layer of foamed plastics of thermoplstic resin incorporated with either or both of calcium sulfite and gypsum.

A fourth object of this invention is to provide a laminated material which satisfies completely mechanical properties required for building materials, furniture, doors, curtain walls, and the like.

A fifth object of this invention is to provide a laminated material in which flexural and tensile strength is increased by applying a surface layer of foamed plastics on one side or both sides of a metallic substrate, which have a synergistic effect on the strength.

A sixth object of this invention is to provide a laminated material in which the weak points in strength of a substrate are solved and the substrate is protected from being damaged, broken, or cracked, by covering both sides of a plastic substrate with a metallic material.

A seventh object of this invention is to provide a laminated material in which the weak points in mechanical strength are solved by covering one side or both sides of a foamed plastics substrate with a woody material so that the buffering property of the woody material is improved and excess stress exerted to the woody material from outside is absorbed by the foamed plastics substrate.

A eighth object of this invention is to provide a laminated material which can be obtained very economically at an extremely cost.

A ninth object of this invention is to provide a laminated material with improved heat insulating and sound absorbing properties.

The above-mentioned objects and other features and advantages of this invention will become apparent as the description proceeds.

Figure 1:
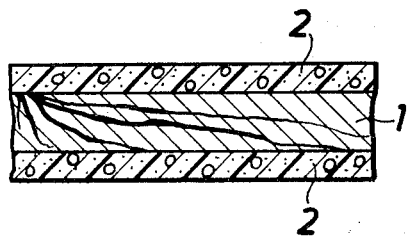
FIG. 1 is a longitudinal sectional view of a laminated material according to Example 1.

Referring now to FIG. 1, there is shown a woody substrate 1, which may be a wooden board, board), plywood board, rigid and flexible fiberboards (e.g., hard board) a particle board, an excelsior board, a paper board, or wood fibers and chips, and a surface layer 2 formed on one side or both sides of the woody substrate 1, which may be a board or sheet of any thickness. The surface layer 2 consists of foamed plastics of such thermoplastic resins as polyethylene, polypropylene, polyvinyl chloride, and the like, a copolymer thereof, or a mixture of a thermoplastic resin and a copolymer thereof, incorporated with either or both of calcium sulfite and gypsum as a filler at a ratio of 1 to 95 wt%. The most preferable range of incorporation of the above-mentioned inorganic fillers is 10 to 85 wt%. Incidentally, the inorganic filler to be incorporated in resin is not restricted in the particle size, but the particle size below 500 micron is preferable. The gypsum to be used in this invention may be of anhydrous, hemihydrate, or dihydrate.

The foamed plastics employed in this inventions may be obtained by treating a mixture of thermoplastic resin, inorganic filler, cross-linking agent, and blowing agent in the conventional foaming process. Such conventional blowing agent as benzene sulfonyl hydrazide, toluene sulfonyl hydrazide, and azodicarbonamide may be used properly at a range of 0.1 to 5 wt% based on the above-mentioned mixture. Foamed plastics may be obtained without any blowing agent by using hemihydrate or dihydrate gypsum as a filler, which forms foams by evaporation of crystallization water when heated under pressure in a mold, followed by rapid release of pressure. The mechanical strength of foamed plastics may be improved by incorporating a proper amount of ethylene-vinylacetate copolymer (EVA) as a copolymer of thermoplastic resin which increases resilience and impact resistance of the principal material.

The above-mentioned woody substrate 1 and foamed plastics surface layer 2 may be bonded with a conventional adhesive.

Because of the capacity to accept inorganic filler in large quantities, the foamed plastics surface layer may be improved in strength and moldability and imparted with flame retardancy, heat resistance, proof of all weathers, etc. which are characteristics of inorganic fillers. Because of its effect as an extender, a filler is useful from a standpoint of production cost. Needless to say, the foamed plastics surface layer is outstanding in sound absorbing property, heat insulating property, and cushioning property which are inherent to foamed substances. As mentioned above, the foamed plastics used in this invention is flame retardant, and even if it should burn, the non-burning inorganic filler present in the resin functions as a metal mesh does, resulting in complete combustion. Thus, unlike conventional products, it does not give out such poisonous gas as carbon monoxide due to incomplete combustion caused by poor circulation of air interfered by a mass of carbonized resin on the surface. Furthermore, the fact that the content of resin itself in the entire foamed plastics can be set at an extremely low level is advantageous in this respect.

By virtue of a compact layer formed on the surface and a fine cellular layer formed inside, the strength, heat resistance, and flame retardancy of the foamed plastics are enhanced.

Figure 3:
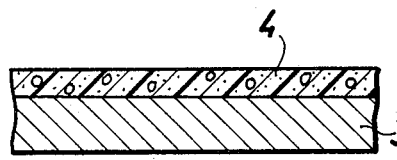
FIG. 3 is a longitudinal sectional view of a laminated material according to Example 3.
Figure 4:
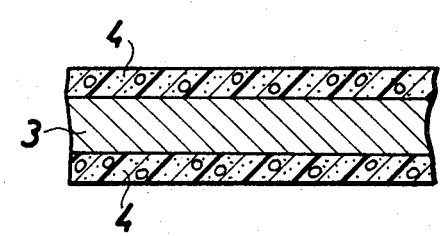
FIG. 4 is a longitudinal sectional view of a laminated material according to Example 4.

Referring now to FIG. 3 and FIG. 4, there is shown a metallic substrate 3 of any composition and shape, such as a plate or mesh made of iron, aluminum, copper, a simple substance of other metals, or an alloy, and a surface layer 4 formed on one side (refer to FIG. 3) or both sides (refer to FIG. 4) of the metallic substrate 3. This surface layer may be made of the same material as used in the previous example.

Figure 5:
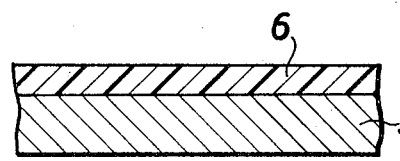
FIG. 5 is a longitudinal sectional view of a laminated material according to Example 5.
Figure 6:
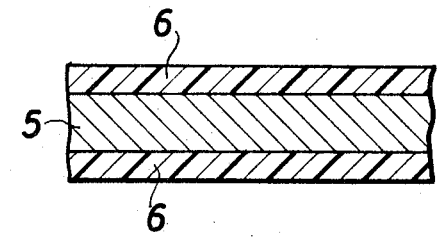
FIG. 6 is a longitudinal sectional view of a laminated material according to Example 6.

In FIG. 5 and FIG. 6, the substrate 5 may be made of the same material as the substrate used in the examples in FIG. 3 and FIG. 4. The surface layer 6 consisting of a synthetic resin composition formed on one side (refer to FIG. 5) or both sides (refer to FIG. 6) of the metallic substrate 5, may be molded from such thermoplastic homopolymer resin as polyethylene, polypropylene, polyvinyl chloride, and the like, a copolymer thereof, or a mixture of thermoplastic homopolymer resin and a copolymer thereof, incorporated with 1 to 95 wt% of either or both of calcium sulfite and gypsum as a filler. The most preferable ratio for incorporation of an inorganic filler is 10 to 90 wt%. In the case of the surface layer according to this invention, the strength and moldability of thermoplastic resin are not deteriorated by the incorporation of a filler in large quantities. The particle size of the inorganic filler to be incorporated into resin or copolymer of thermoplastic resin and gypsum to be used in these examples are similar to those used in the first example.

Bonding of the metallic substrate 5 and the surface layer 6 may be accomplished by the same means as employed in the previous example, or the surface layer may be formed by applying, by brushing or dipping, a melt of resin composition incorporated with a filler or a dispersion in a suitable solvent such as hydrocarbon onto the substrate.

The surface layer 6 according to this invention maintains the strength and moldability inherent to thermoplastic resin even when an inorganic filler is incorporated in large quantities. By virtue of flame retardancy, heat resistance, heat insulation, stiffness, corrosion resistance, etc. imparted by inorganic fillers, the surface layer makes up the faults of a metallic substrate which is easy to corrode and damage.

Figure 7:
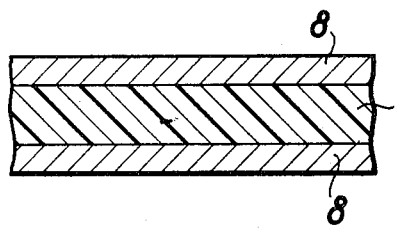
FIG. 7 is a longitudinal sectional view of a laminated material according to Example 7.

Referring to FIG. 7, there is shown a plastics substrate 7 consisting of the same material as the surface layer 6 shown in FIG. 5 and FIG. 6. To both sides of this plastics substrate 7 are firmly attached the surface layers 8 with an adhesive or by other similar means. The surface layers 8 consist of the same material as the metallic substrate 5 as explained in FIG. 5 and FIG. 6.

The substrate consisting of a resin composition is made flame retardant by incorporating an inorganic filler, and furthermore it is made completely incombustible by the metallic surface layers laminated on both sides thereof. Thus, this laminate product will be useful as a building material, if the surface layers are finished with paint as required.

Figure 2:
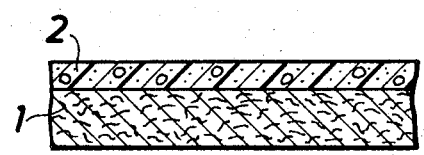
FIG. 2 is a longitudinal sectional view of a laminated material according to Example 2.
Figure 8:
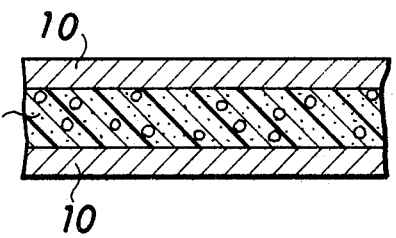
FIG. 8 is a longitudinal sectional view of a laminated material according to Example 8.

Referring to FIG. 8, there is shown a foamed substrate 9 consisting of the same material as the surface layer 2 in FIG. 1 and FIG. 2, and surface layers 10 consisting of the same material as the surface layer 8 in FIG. 7, provided on both sides of the substrate 9.

In this example both sides of the foamed substrate are covered with the surface layers consisting of a metallic material. Thus, the foamed body which is easy to damage and break, is reinforced with a metallic material. In this way an extremely useful building material is obtained.

Figure 9:
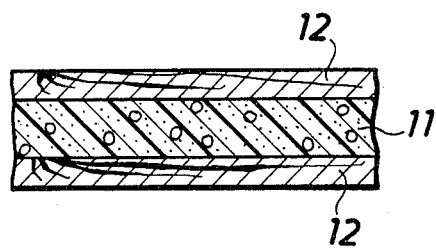
FIG. 9 is a longitudinal sectional view of a laminated material according to Example 9.

Referring finally to FIG. 9, there is shown a foamed plastics substrate 11 consisting of the same material as the foamed plastics substrate 9 in FIG. 8, and surface layers 12, consisting of the same material as the woody substrate as explained in FIG. 1 and FIG. 2, firmly attached to both sides of the foamed plastics substrate 11.

In the case of a laminatd material of this example, the surface layers consisting of woody material are reinforced with the foamed plastics substrate. Thus, the woody material is protected from cracking and its grains on the surface have a decorative effect. Furthermore, excess stress applied to the woody material from outside is absorbed by the foamed plastics substrate and the mechanical properties of the woody material will be saved. By applying painting or coating for the purpose of fire protection, moisture-proofing, water-proofing, corrosion resistance, or decoration, more useful laminates for building material and furniture will be obtained.

The following examples illustrate the preferred composition for the plastics surface layer in this invention.

Example 1

| | |
|---|---|
| High density polyethylene | 50 wt% |
| Calcium sulfite | 25 wt% |
| Gypsum, hemihydrate | 23 wt% |
| Benzene sulfonyl hydrazide (Blowing agent) | 1.5 wt% |
| tert-Butyl peroxide (Cross-linking agent) | 0.5 wt% |

A mixture of the above composition was molded under heat (150°C and pressure (100 kg/cm$^2$) and then pressure was released to obtain a foamed plastics. This foamed plastics was then sliced into 12-mm thick plates. This plate was bonded with a hot-melt adhesive to one side of a 10-mm thick wooden plate to obtain a lamination for interior finish.

Example 2

| | |
|---|---|
| High density polyethylene | 50 wt% |
| Calcium sulfite | 23 wt% |
| Gypsum, hemihydrate | 25 wt% |
| Benzene sulfonyl hydrazide (Blowing agent) | 1.5 wt% |
| tert-Butyl peroxide (Cross-linking agent) | 0.5 wt% |

A mixture of the above composition was molded under the same conditions as with Example 1 and then pressure was released to obtain a foamed plastics. This foamed plastics was then sliced into 8-mm thick plates. This plate was bonded with a hot-melt adhesive to one side of a 5-mm thick steel plate to obtain a lamination for interior finish.

The following examples illustrate the preferred compositions for plastics substrates.

Example 3

| | |
|---|---|
| High density polyethylene | 35 wt% |
| Calcium sulfite | 56 wt% |
| Gypsum, hemihydrate | 20 wt% |

A resin compound of the above composition was mixed in a Banbury mixer, and the resultant compound was molded into a 3-mm thick sheet by extrusion. This sheet was bonded to one side of a 5-mm thick steel plate with a hot-melt adhesive to obtain a lamination for interior finish.

Example 4

| | |
|---|---|
| Polypropylene | 35 wt% |
| Calcium sulfite | 65 wt% |

A resin compound of the above composition was dispersed in toluene. Into this solution was dipped a 6-mm thick aluminum plate, followed by drying, to form a sheet of the resin compound on the surface of the aluminum plate. Thus a decorative plate was obtained.

Example 5

| | |
|---|---|
| High density polyethylene | 30 wt% |
| Calcium sulfite | 50 wt% |
| Gypsum, hemihydrate | 20 wt% |

A resin compound of the above composition was mixed in a Banbury mixer, and the resultant compound was molded into a 10-mm thick sheet by extrusion. To both sides of tthis molding were bonded a 3-mm metal plate with a hot-melt adhesive to obtain a lamination.

In the following examples the preferred compositions for foamed plastics substrate are illustrated.

Example 6

| | |
|---|---|
| High density polyethylene | 50 wt% |
| Calcium sulfite | 23 wt% |
| Gypsum, dihydrate | 25 wt% |
| Benzene sulfonyl hydrazide | 1.5 wt% |
| tert-Butyl peroxide | 0.5 wt% |

A resin compound of the above composition was mixed in a Banbury mixture, and the resultant compound was molded under a pressure of 100 kg/cm$^2$ at a temperature of 150°C and the pressure was released rapidly to obtain a foamed plastics. This foamed plastics was sliced into 12-mm thick plates. Onto both sides of the foamed plastics sheet were bonded 3-mm thick metal plates with a hot-melt adhesive to obtain a lamination.

Example 7

| | |
|---|---|
| High density polyethylene | 50 wt% |
| Calcium sulfite | 23 wt% |
| Gypsum, dihydrate | 25 wt% |
| Benzene sulfonyl hydrazide | 1.5 wt% |
| tert-Butyl peroxide (Cross-linking agent) | 0.5 wt% |

A resin compound of the above composition was mixed in a Banbury mixer, and the resultant compound was molded under a pressure of 100 kg/cm$^2$ at a temperature of 150°C and the pressure was released rapidly to obtain a foamed plastics. This foamed plastics was sliced into 12-mm thick plates. Onto one side of the foamed plastics sheet was bonded a 3-mm thick wood board with a hot-melt adhesive. The wood board was further coated with melamine resin paint to obtain a lamination for interior finish.

As has been described in the above, a laminate according to this invention has outstanding heat insulating property, sound absorbing property, and cushioning property, and the impact resistance, moldability, heat resistance, flame retardant property, corrosion resistance and so on are improved by inorganic fillers incorporated in the plastics surface layer or plastics substrate. A lamination according to this invention is not only flame retardant but also safe because it gives out no poisonous gas even if it should burn.

Cost reduction to an extreme extent is possible with the use of inexpensive gypsum or calcium sulfite filler, which is also used as an extender.

What is claimed is:

1. A laminated material comprising at least one layer of a material selected from the group consisting of woody material and metallic material, and bonded thereto in laminated relationship at least one layer of a filled resinous composition of at least one member selected from the group consisting of thermoplastic homopolymer resins, copolymers thereof and mixtures thereof, containing a filler selected from the group consisting of calcium sulfite, gypsum, and mixtures thereof.

2. The laminated material according to claim 1, wherein said filled resinous composition layer is a foamed surface layer, bonded on at least one side of a substrate of woody material.

3. The laminated material according to claim 1, wherein said filled resinous composition layer is a substrate on one or both sides of which is bonded metallic material.

4. The laminate material according to claim 1, wherein said member of woody material is any one selected from the group consisting of wood board, plywood board, flexible or rigid fiber board, particle board, woodfiber cement board, and woody chips.

5. The laminated material according to claim 1, wherein said member of metallic material is any one selected from the group consisting of iron, aluminum and copper plate.

6. The laminated material according to claim 3, wherein said filled resinous composition layer is a foamed, substrate on one or both sides of which is bonded said member of metallic material.

7. The laminated material according to claim 6, wherein said member of metallic material is any one selected from the group consisting of iron, aluminum and copper plate.

8. The laminated material according to claim 1, wherein said filled resinous composition layer is a foamed substrate on one or both sides of which is bonded woody material.

9. The laminated material according to claim 8, wherein said member of woody material is any one selected from the group consisting of wood board, plywood board, flexible or rigid fiber board, particle board, woodfiber cement board, and woody chips.

10. The laminated material according to claim 1, wherrein said filled resinous composition layers are surface ones bonded on at least one side to a substrate of metallic material.

11. The laminated material according to claim 10, wherein said member of metallic material is any one selected from the group consisting of iron, aluminum and copper plate.

12. The laminated material according to claim 1, wherein said copolymers consist of ethylene-vinylacetate.

13. The laminated material according to claim 1, wherein said filled resinous composition further contains a blowing agent selected from the group consisting of benzene sulfonyl hydrozide, toluene sulfonyl hydrazide and azodicarbonamide at a range of 0.1 - 5% by weight.

* * * * *